United States Patent
Patel et al.

(10) Patent No.: US 9,432,279 B2
(45) Date of Patent: Aug. 30, 2016

(54) METHODS AND APPARATUS FOR HOME AGENT DISCOVERY IN MOBILE IP USING LINK STATE ADVERTISEMENTS

(71) Applicant: Cisco Technology, Inc., San Jose, CA (US)

(72) Inventors: Alpesh S. Patel, Pleasanton, CA (US); Kent K. Leung, Los Altos, CA (US); Gopal K. Dommety, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/299,834

(22) Filed: Jun. 9, 2014

(65) Prior Publication Data

US 2015/0029935 A1    Jan. 29, 2015

Related U.S. Application Data

(62) Division of application No. 11/903,998, filed on Sep. 24, 2007, now Pat. No. 8,750,200.

(51) Int. Cl.
| | |
|---|---|
| *H04W 4/00* | (2009.01) |
| *H04L 12/751* | (2013.01) |
| *H04W 8/06* | (2009.01) |
| *H04W 80/04* | (2009.01) |

(52) U.S. Cl.
CPC .............. *H04L 45/02* (2013.01); *H04W 8/065* (2013.01); *H04W 80/04* (2013.01)

(58) Field of Classification Search
CPC ....................................................... H04L 45/02
USPC ....................................................... 370/328
See application file for complete search history.

(56) References Cited

U.S. PATENT DOCUMENTS

| | | | |
|---|---|---|---|
| 6,665,718 B1 | 12/2003 | Chuah et al. | |
| 6,973,057 B1 * | 12/2005 | Forslow | H04L 45/50 370/328 |
| 8,036,104 B2 * | 10/2011 | Corson et al. | 370/217 |
| 8,526,404 B2 * | 9/2013 | Leung et al. | 370/338 |
| 2003/0182433 A1 | 9/2003 | Kulkarni et al. | |
| 2003/0193921 A1 | 10/2003 | Kim | |
| 2004/0160941 A1 | 8/2004 | Suh et al. | |
| 2004/0176095 A1 | 9/2004 | Yamada et al. | |
| 2004/0264465 A1 | 12/2004 | Dunk | |
| 2005/0099971 A1 | 5/2005 | Droms et al. | |
| 2008/0062917 A1 * | 3/2008 | Oguchi | 370/328 |
| 2008/0107070 A1 | 5/2008 | Sastry | |
| 2010/0046524 A1 | 2/2010 | Rune et al. | |

OTHER PUBLICATIONS

Deering, S., ICMP Router Discovery Messages, Sep. 1991, pp. 4-5.
Moy, J. RFC 1583, Network Working Group, OSPF Version 2, Mar. 1994, http://www.freesoft.org/CIE/RFC/1583/index/htm, 4 pages.
Perkins, Ed C., Network Working Group, IP Mobility Support for IPv4, Aug. 2002, http://www.ietf.org/rfc.rfc3344.txt, 53 pages.

* cited by examiner

*Primary Examiner* — Wei Zhao
(74) *Attorney, Agent, or Firm* — Polsinelli PC

(57) ABSTRACT

In one embodiment, an apparatus receives an advertisement from each of one or more Home Agents, the advertisement including a first set of information associated with a corresponding one of the Home Agents, each advertisement being in a first protocol. The apparatus obtains the first set of information associated with a corresponding one of the Home Agents from each advertisement. The apparatus composes a router advertisement including a second set of information associated with at least one of the Home Agents, the router advertisement being in a second protocol. The apparatus then sends the router advertisement.

20 Claims, 8 Drawing Sheets

| Advertisement 302 | Home Agent address 304 | Load on Home Agent 306 | Home Agent domain name 308 |

FIG. 3A

| Router Advertisement 310 | - Home Agent 1 IP address 316<br>- Load on Home Agent 1 318<br>- Home Agent 1 domain name 320<br>- Distance to Home Agent 1 322 | ... | - Home Agent n IP address 324<br>- Load on Home Agent n 326<br>- Home Agent n domain name 328<br>- Distance to Home Agent n 330 |

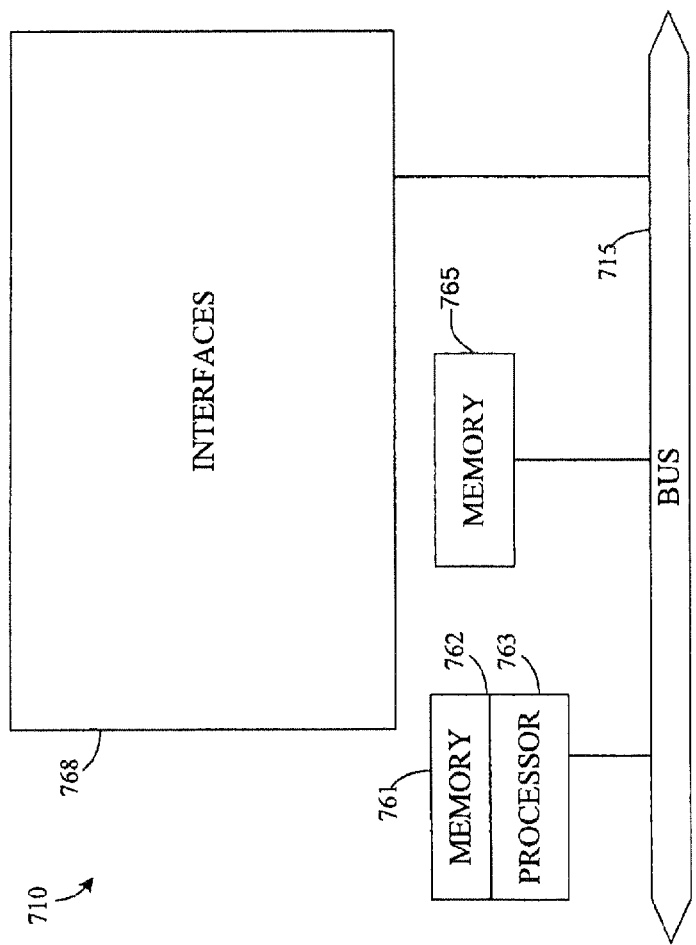

US 9,432,279 B2

METHODS AND APPARATUS FOR HOME AGENT DISCOVERY IN MOBILE IP USING LINK STATE ADVERTISEMENTS

RELATED CASES

This Application is a divisional of U.S. patent application Ser. No. 11/903,998, filed on Sep. 24, 2007, the content of which is incorporated herein by reference in its entirety.

BACKGROUND

1. Technical Field

The present disclosure relates generally to methods and apparatus for supporting Home Agent discovery using advertisements.

2. Description of the Related Art

A node that supports Mobile IP is typically referred to as a Mobile Node. Packets addressed to the Mobile Node are generally transmitted to the Mobile Node's home address. When the Mobile Node roams outside its home network, the Mobile Node generally registers with its Home Agent in order to notify the Home Agent of its location (i.e., care-of address). Upon successfully registering the Mobile Node, the Home Agent typically establishes a binding between the Mobile Node and its care-of address. Thereafter, the Home Agent may access the binding to ascertain the Mobile Node's care-of address. Thus, when the Home Agent receives packets addressed the Mobile Node's home address, the Home Agent may forward packets addressed to the Mobile Node to the Mobile Node's care-of address.

In order to register with its Home Agent, the Mobile Node generally composes a registration request that identifies the address of the Home Agent. Thus, each Mobile Node is typically statically configured with a Home Agent address. More particularly, static configuration generally involves manual configuration of a Home Agent address on each of the Mobile Nodes. However, provisioning the address of a Home Agent in every Mobile Node is a cumbersome process.

BRIEF DESCRIPTION OF THE DRAWINGS

FIG. 3A is a diagram illustrating an example advertisement that may be transmitted by a Home Agent.

FIG. 3B is a diagram illustrating an example router advertisement that may be transmitted by an edge router.

FIG. 7 is a diagrammatic representation of an example router in which various embodiments may be implemented.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, an apparatus receives an advertisement from each of one or more Home Agents, the advertisement including a first set of information associated with a corresponding one of the Home Agents, each advertisement being in a first protocol. The apparatus obtains the first set of information associated with a corresponding one of the Home Agents from each advertisement. The apparatus composes a router advertisement including a second set of information associated with at least one of the Home Agents, the router advertisement being in a second protocol. The apparatus then sends the router advertisement.

Specific Example Embodiments

When a Correspondent Node sends packets to a Mobile Node, the packets are typically addressed to the Mobile Node's home address. When the Mobile Node roams from its home network to another location, the Mobile Node may compose a registration request identifying the Mobile Node's care-of address and the Mobile Node's home address (or other identifier) and transmit the registration request to the Mobile Node's Home Agent. Upon successfully registering the Mobile Node with the Home Agent, the Home Agent typically establishes a binding between the Mobile Node and its care-of address. Once the binding has been established, the Home Agent may forward packets to the Mobile Node at its care-of address.

The care-of address may be a collocated care-of address that the Mobile Node has obtained. Alternatively, the care-of address may be an address associated with a Foreign Agent in a Mobile IPv4 network. (A network supporting Mobile IPv6 does not include Foreign Agents.)

In Mobile IPv4, the Mobile Node registers with a Home Agent by sending a registration request and receives a registration reply in response. In Mobile IPv6, the registration request is referred to as a binding update, while the registration reply is referred to as a binding acknowledgement. In the following description, the terms registration request and registration reply are used. However, it is important to note that the disclosed embodiments are not limited to a particular version of Mobile IP.

In accordance with various embodiments, Mobile Nodes need not be statically configured with a particular Home Agent. Rather than being statically configured with a Home Agent address, Mobile Nodes may dynamically discover one or more Home Agents with which they can register. This may be accomplished via one or more advertisements, as will be described in further detail below.

Figure 1:
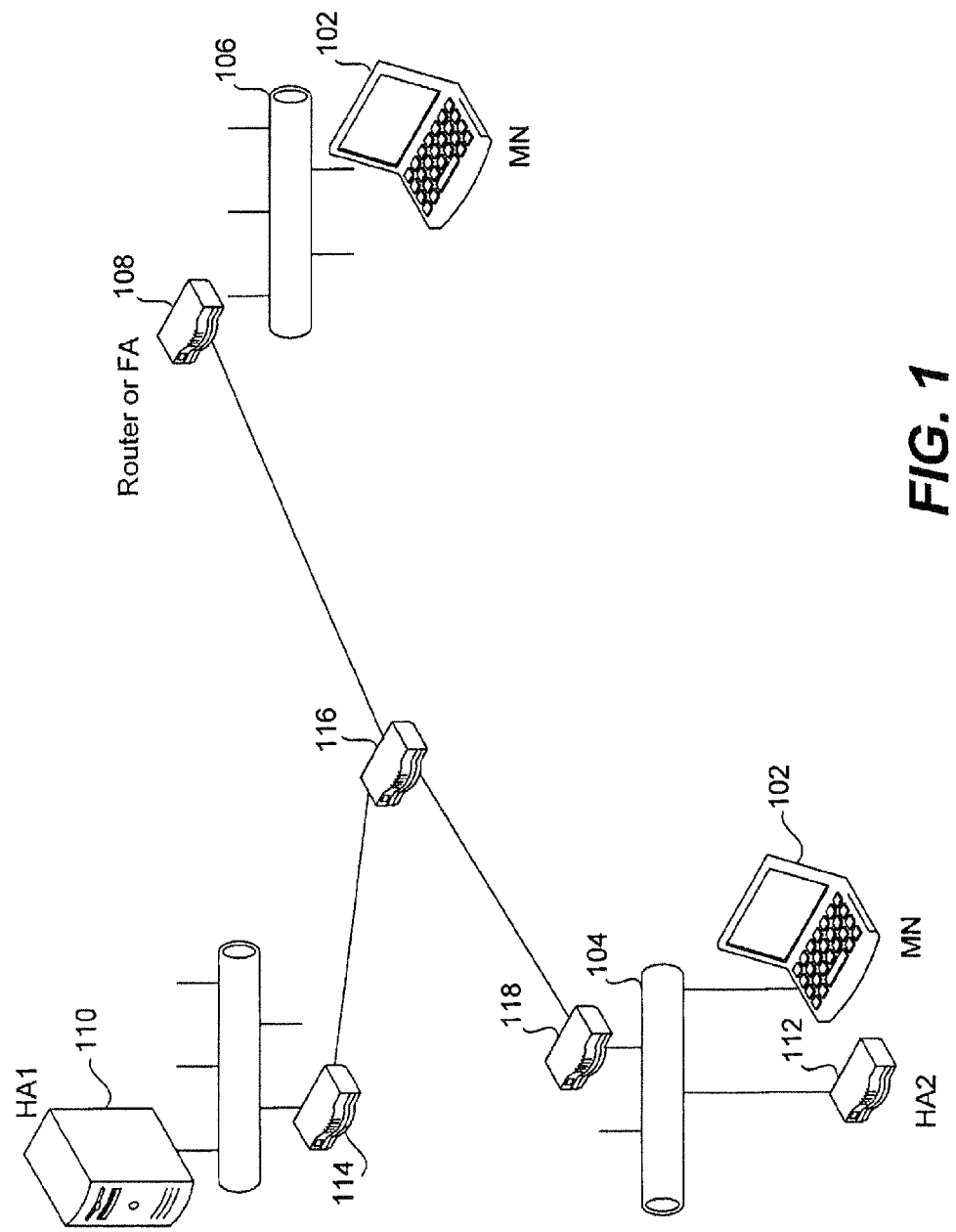
FIG. 1 is a diagram illustrating an example system.

FIG. 1 is a diagram illustrating an example system. In order for a Mobile Node (MN) 102 to roam from a home network segment 104 to a foreign network segment 106, the Mobile Node 102 may send a registration request to a Home Agent via a network device 108, which may be a Foreign Agent or a router. However, in accordance with various embodiments, since the Mobile Node 102 is not statically configured with a Home Agent address, the Mobile Node 102 may obtain an IP address of a Home Agent dynamically, as will be described in further detail below.

A network may include any number of Home Agents. In this example, there are two different Home Agents, Home Agent 1 (HA1) 110 and Home Agent 2 (HA2) 112. Each of the Home Agents 110, 112 may separately send an advertisement that includes mobility specific data that relates to the Home Agent. For example, such an advertisement may include an IP address of the corresponding Home Agent, as well as other information such as an indicator of the load on the Home Agent and/or the domain name of the Home Agent. Advertisements such as router advertisements are typically broadcast, enabling entities such as routers and/or Mobile Nodes to receive the advertisements.

The advertisement that is sent by each Home Agent may be in a protocol such as a routing protocol. Examples of routing protocols that may be implemented may include a link state routing protocol such as Open Shortest Path first (OSPF). For example, an advertisement transmitted in accordance with OSPF may be referred to as a Link State Advertisement (LSA). A link state routing protocol is often used to transport a router's local routing topology to all other local routers in the same OSPF area. Other routing protocols that may be used include, but are not limited to, Intermediate System (ISIS) protocol and Enhanced Interior Gateway Routing Protocol (EIGRP). By leveraging advertisements such as routing advertisements, the availability of mobility services such as that provided by one or more Home Agents may be advertised. In this manner, routers and/or Mobile Nodes may discover available Mobile IIP agents (e.g., Home Agents or Foreign Agents) and/or available services such as Mobile IP services.

When the HA1 110 sends an advertisement, routers such as router 114 and router 116 may forward the advertisement sent by HA1 110 without interpreting or otherwise processing the advertisement. Similarly, when the HA2 112 sends an advertisement, routers such as router 118 and 116 may forward the advertisement sent by HA2 112 without interpreting or otherwise processing the advertisement. In other words, core routers need not be configured to perform the disclosed processes.

In contrast, upon receive an advertisement transmitted by a Home Agent, an edge router that is at an edge of the network may process or otherwise interpret the advertisement. Since an edge router is at the edge of the network, an edge router may be one hop from a Mobile Node. An edge router may also provide additional functionality, such as that of a Foreign Agent. For example, the network device 108 may function as an edge router to process advertisements it has received from Home Agents, and generate and send one or more router advertisements.

In this example, upon receiving the advertisement from each of the Home Agents 110, 112, the network device 108 may receive and process each advertisement. More particularly, the network device 108 may function as an edge router to obtain information from the advertisement received from each Home Agent. In addition, the network device 108 may also generate additional information, such as the distance to the Home Agent (e.g., from the edge router or the Mobile Node).

The network device 108 may then generate one or more router advertisements that may be interpreted by a network device supporting Mobile IP, such as a Mobile Node. For instance, each of the router advertisements generated and transmitted by an edge router may be in a protocol that is not a routing protocol. Accordingly, a Mobile Node (or proxy device acting on behalf of a node that does not support Mobile IP) need not interpret or otherwise support particular routing protocols.

Router advertisement(s) transmitted by an edge router may be in a protocol such as Internet Control Message Protocol (ICMP) Router Discovery Protocol (IRDP). IRDP enables a host to determine a router IP address that it can use as a default gateway. IRDP is a router discovery method that may be used on multicast links in an IP based network. IRDP eliminates the need for manual configuration of router addresses and is independent of any specific routing protocol.

Hosts typically discover a router's IP address before they send IP packets outside their subnet. For example, a host may read a list of one or more router addresses from a (possibly remote) configuration file at startup time. However, since configuration files must be maintained manually, maintaining configuration files is a significant administrative burden. Moreover, configuration files are unable to track dynamic changes in router availability. Through the use of a protocol such as IRDP, a host may dynamically identify a router IP address that it can use as a default gateway.

On multicast links, some hosts may also discover router addresses by listening to routing protocol traffic. However, eavesdropping on routing traffic typically requires that hosts recognize the particular routing protocols in use, which vary from subnet to subnet and which are subject to change at any time. ICMP router discovery messages do not constitute a routing protocol. As a result, hosts (e.g., Mobile Nodes or proxy devices) need not recognize a particular routing protocol supported by core routers.

IRDP typically uses ICMP router advertisements and router solicitation messages to allow a host to discover the addresses of operational routers on a subnet. Each router may periodically multicast a router advertisement from each of its multicast interfaces, announcing the router's IP address on that interface. Hosts may listen for router advertisements to discover the addresses of their neighboring routers. When a host attached to a multicast link starts up, it can send a multicast router solicitation to ask for immediate router advertisements, rather than waiting for the next periodic ones to arrive. If no router advertisements are forthcoming, the host may retransmit the solicitation.

ICMP discovery messages have not traditionally determined which router is best to reach a particular destination. Similarly, ICMP discovery messages have not previously been used to provide information enabling a host to select the best router to reach a particular destination. Rather, if a host chooses a poor first-hop router for a particular destination, it typically receives an ICMP redirect from that router identifying a better one.

In accordance with various embodiments, an edge router may transmit router advertisements to enable Mobile Nodes (or proxy devices) to discover the existence of Home Agents. More particularly, router advertisements may be transmitted in the form of ICMP discovery messages, which may include one or more extensions, as will be described in further detail below with reference to FIG. 3B.

Each of the router advertisements transmitted by an edge router may include information associated with one or more Home Agents. For instance, the information that an edge router provides in a router advertisement may include or otherwise indicate information that the edge router has obtained from advertisements received from Home Agents, such as a Home Agent IP address, a load on the Home Agent, and/or a domain name of the Home Agent. Moreover, the information that an edge router provides in a router advertisement may also include information generated by the edge router, such as the distance to the Home Agent.

Once the Mobile Node 102 receives one or more router advertisements from an edge router, it may obtain and/or interpret the information in the router advertisement(s) to select a Home Agent. The Mobile Node 102 may then register with the selected Home Agent. Upon successfully registering with the selected Home Agent, packets may be forwarded by the selected Home Agent to the Mobile Node 102.

Figure 2A:
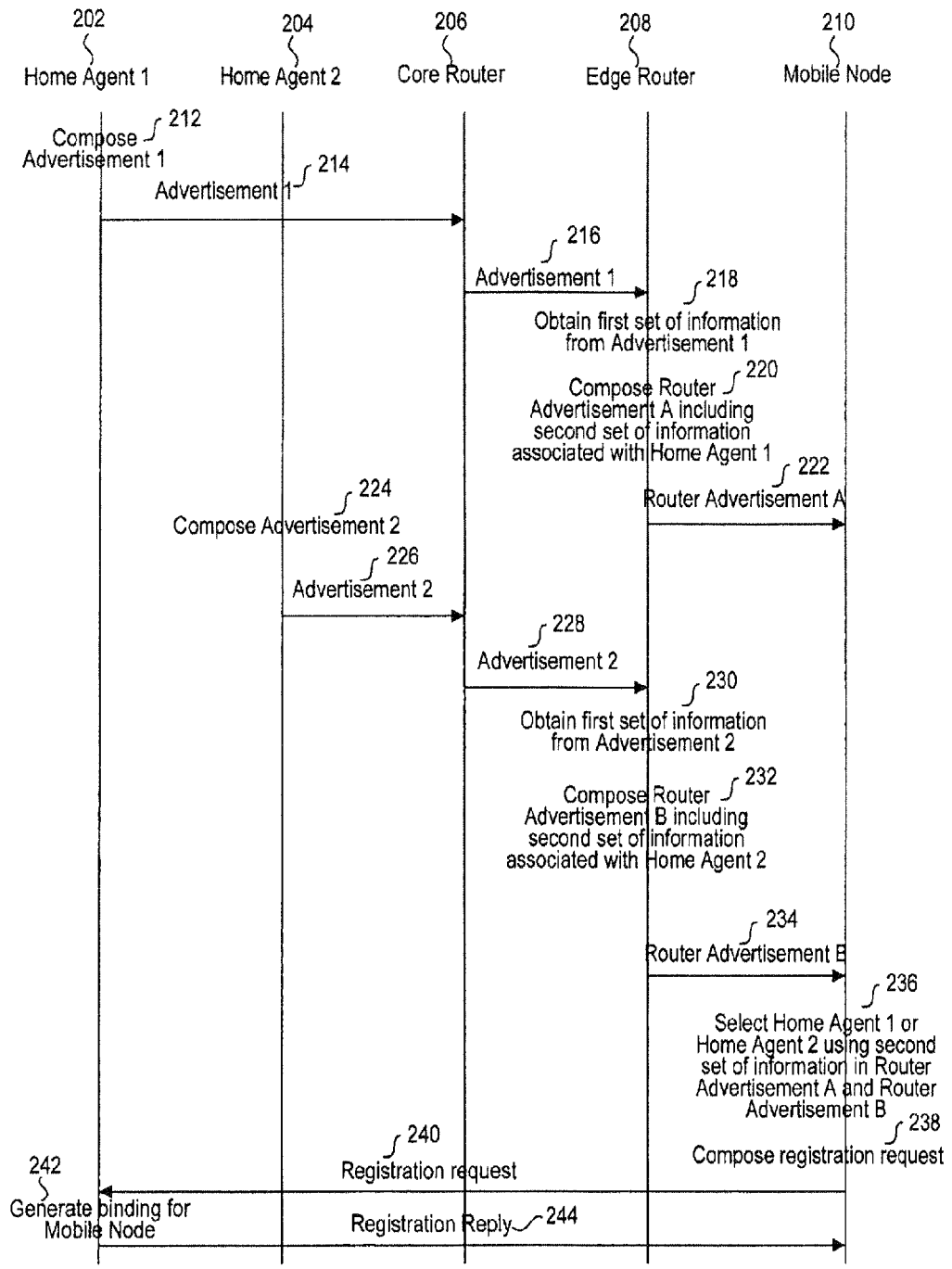
FIGS. 2A-2B are transaction flow diagrams illustrating example methods of performing home agent discovery.
Figure 2B:
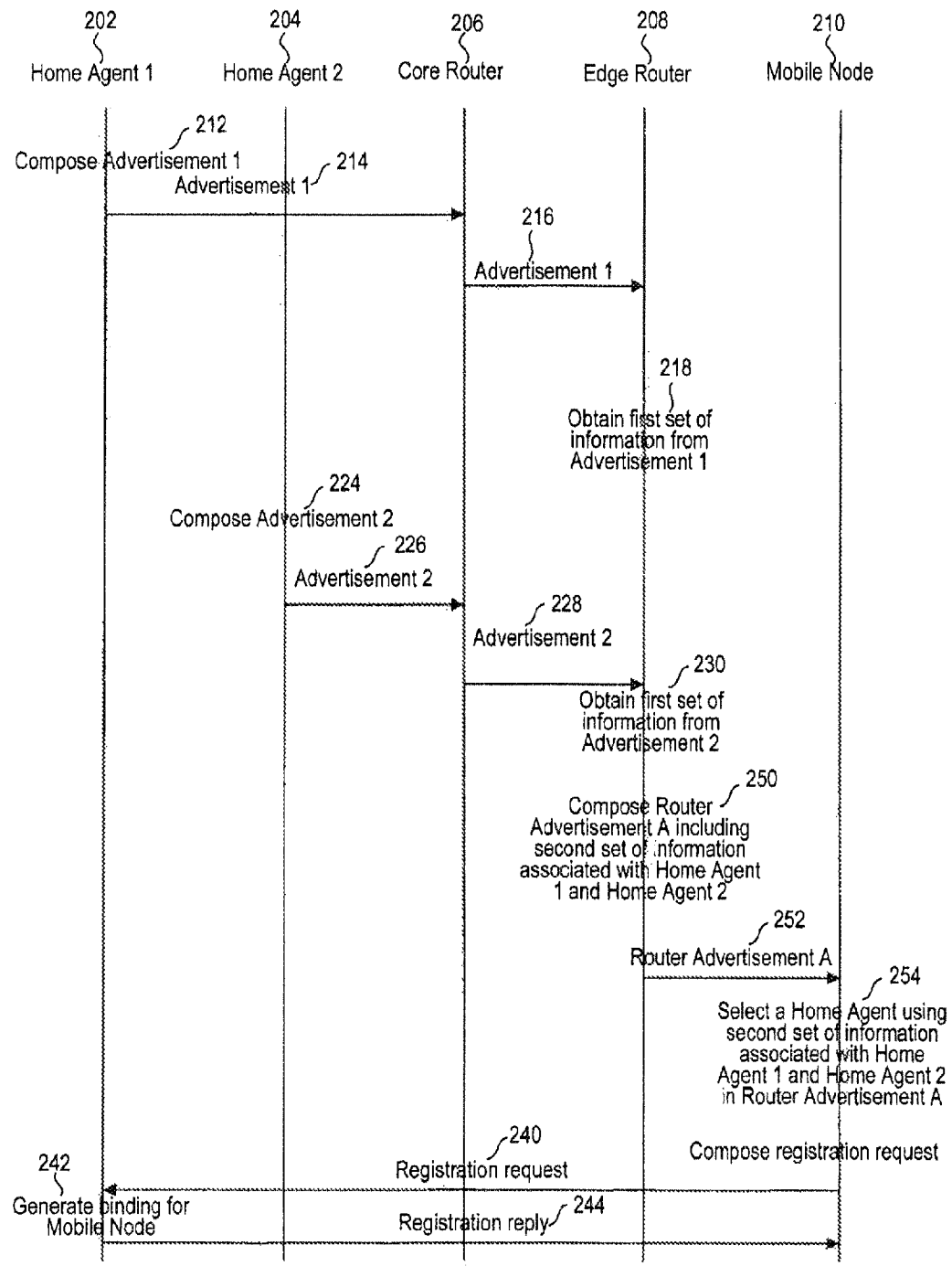

FIGS. 2A-2B are transaction flow diagrams illustrating methods of performing home agent discovery. As shown in FIG. 2A, steps performed by a first Home Agent (HA1), a second Home Agent (HA2), a core router, an edge router, and a Mobile Node, a described with reference to the corresponding vertical lines 202, 204, 206, 208, 210, as shown. Each Home Agent may send an advertisement via a routing protocol such as OSPF. More particularly, HA1 may compose an advertisement, Advertisement 1, at 212. When HA1 sends the advertisement at 214, the advertisement may be routed via one or more core routers. For instance, the core router may intercept Advertisement 1 at 214, and route Advertisement 1 to the edge router at 216. For example, the edge router may run the same routing protocol as the Home Agent.

When the edge router receives Advertisement 1, it may process Advertisement 1 by parsing Advertisement 1 to obtain a first set of information from Advertisement 1 at 218. The edge router may then compose a router advertisement, Router Advertisement A, including a second set of information associated with Home Agent 1 at 220. The second set of information may include at least a portion of the first set of information and/or data regarding Home Agent 1 that the edge router has obtained or generated. When the edge router transmits Router Advertisement A to the Mobile Node at 222, the Mobile Node may use the information in Router Advertisement A to determine whether the Mobile Node wishes to register with Home Agent 1.

Similarly, HA2 may compose an advertisement, Advertisement 2, at 224, and send Advertisement 2 at 226. A core router may intercept and route Advertisement 2 to the edge router at 228. When the edge router receives Advertisement 2, it may process Advertisement 2 by parsing Advertisement 2 to obtain a first set of information from Advertisement 2 at 230. The edge router may then compose a router advertisement, Router Advertisement B, including a second set of information associated with Home Agent 2 at 232. The second set of information may include at least a portion of the first set of information and/or data regarding Home Agent 2 that the edge router has obtained or generated. When the edge router transmits Router Advertisement B to the Mobile Node at 234, the Mobile Node may use the information in Router Advertisement B to determine whether the Mobile Node wishes to register with Home Agent 2.

The Mobile Node may select either Home Agent 1 or Home Agent 2 using the second set of information in Router Advertisement A and Router Advertisement B at 236. The Mobile Node may compose a Mobile IP registration request at 238 and send the registration request to the selected Home Agent at 240. In this example, the Mobile Node has selected Home Agent 1. Upon successfully registering the Mobile Node, Home Agent 1 generates a binding for the Mobile Node at 242 binding the Mobile Node to its care-of address. Home Agent 1 may then send a registration reply to the Mobile Node at 244 indicating that the registration was successful.

As shown in FIG. 2B, each Home Agent may send an advertisement, as described above with reference to FIG. 2AQ. More particularly, HA1 may compose an advertisement, Advertisement 1, at 212. When HA1 sends the advertisement at 214, the advertisement may be routed via one or more core routers. For instance, the core router may intercept Advertisement 1 at 214, and route Advertisement 1 to the edge router at 216. When the edge router receives Advertisement 1, it may process Advertisement 1 by parsing Advertisement 1 to obtain a first set of information from Advertisement 1 at 218. Similarly, HA2 may compose an advertisement, Advertisement 2, at 224, and send Advertisement 2 at 226. A core router may intercept and route Advertisement 2 to the edge router at 228. When the edge router receives Advertisement 2, it may process Advertisement 2 by parsing Advertisement 2 to obtain a first set of information from Advertisement 2 at 230.

In this example, the edge router composes a single router advertisement including a second set of information associated with multiple Home Agents, rather than composing a router advertisement on behalf of each Home Agent. More particularly, the edge router composes a router advertisement, Router Advertisement A, including a second set of information associated with both Home Agent 1 and Home Agent 2 at 250. The edge router may send Router Advertisement A at 252. When the Mobile Node receives Router Advertisement A, it may select a Home Agent using the second set of information associated with Home Agent 1 and Home Agent 2 in Advertisement A at 254.

The Mobile Node may compose a Mobile IP registration request at 238 and send the registration request to the selected Home Agent at 240. In this example, the Mobile Node has selected Home Agent 1. Upon successfully registering the Mobile Node, Home Agent 1 generates a binding for the Mobile Node at 242 binding the Mobile Node to its care-of address. Home Agent 1 may then send a registration reply to the Mobile Node at 244 indicating that the registration was successful.

FIG. 3A is a diagram illustrating an example advertisement 302 that may be transmitted by a Home Agent. The advertisement 302 may include information such as a Home Agent address 304, load 306 on the Home Agent and/or Home Agent domain name 308.

An edge router may compose a router advertisement based upon information obtained from one or more advertisements such as that shown in FIG. 3A. FIG. 3B is a diagram illustrating an example router advertisement that may be transmitted by an edge router. More particularly, a router advertisement 310 may include at least a portion of the information provided in one or more advertisements such as that shown in FIG. 3A and/or may include information that the edge router has obtained or generated. In this example, the router advertisement 310 includes a set of information 312 associated with Home Agent 1, and may further include an additional set of information 314 associated with one or more additional Home Agents, shown here as Home Agent n.

The set of information 312 associated with Home Agent 1 may include information from the corresponding Home Agent advertisement, such as Home Agent n IP address 316, load on Home Agent 1 318, and/or Home Agent 1 domain name 320. In addition, the set of information 312 associated with Home Agent 1 may include information that the edge router has obtained or generated, such as the distance to Home Agent 1 322. More particularly, the distance to Home Agent 1 322 may be the distance from the edge router to Home Agent 1.

The set of information 314 associated with Home Agent n may include information from the corresponding Home Agent advertisement, such as Home Agent n IP address 324, load on Home Agent n 326, and/or Home Agent n domain name 328. In addition, the set of information 314 associated with Home Agent n may include information that the edge router has obtained or generated, such as the distance to Home Agent n 330. More particularly, the distance to Home Agent n 330 may be the distance from the edge router to Home Agent n.

The set of information associated with each Home Agent that is provided in a router advertisement such as 310 may provide in separate extensions to the router advertisement 310. For example, the set of information 312 associated with Home Agent 1 may be provided in a first extension to the router advertisement 310. Similarly, the set of information 314 associated with Home Agent n may include information associated with Home Agent n.

Figure 4:
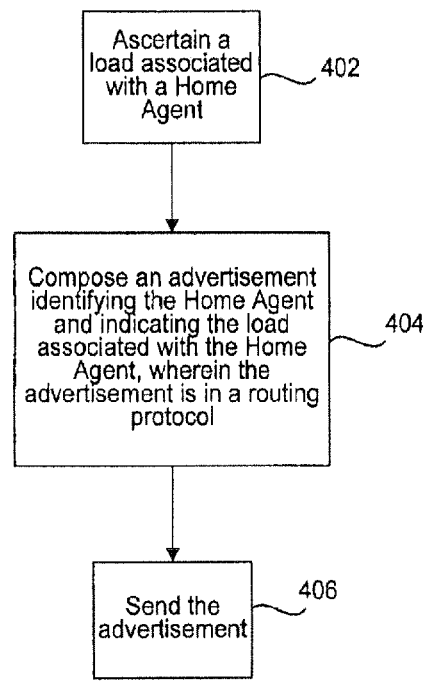
FIG. 4 is a process flow diagram illustrating an example method of composing a router advertisement by a Home Agent or router on behalf of a Home Agent that is not a router.

FIG. 4 is a process flow diagram illustrating an example method of composing a router advertisement by a Home Agent or router on behalf of a Home Agent that is not a router. As shown at 402, a network device may ascertain a load associated with a Home Agent. The network device may then compose an advertisement identifying the Home Agent and indicating the load associated with the Home Agent at 404, wherein the router advertisement is in a routing protocol. The network device may then send the advertisement at 406.

In circumstances in which the Home Agent is a router, the network device may of FIG. 4 be the Home Agent. Alternatively, if the Home Agent is not a router, the Home Agent may send a message to a router that includes information such as the IP address of the Home Agent, domain name of the Home Agent, and/or load on the Home Agent. The router may then operate as the network device, as described above with reference to FIG. 4.

Each advertisement that is transmitted by a Home Agent may ultimately be processed by an edge router. Moreover, receiving an advertisement from a Home Agent may also trigger the transmission of a router advertisement by an edge router. As a result, it may be desirable to limit the number of advertisements that are transmitted by a Home Agent.

In one embodiment, an advertisement may be composed and transmitted by a Home Agent (or on behalf of a Home Agent) when the load on the Home Agent has changed more than a predetermined amount or percentage. For example, the advertisement may be composed and transmitted only if a change in load is greater than equal to 25 percent. In this manner, information may be propagated via advertisements only when load changes (or other changes) are deemed significant.

Figure 5:
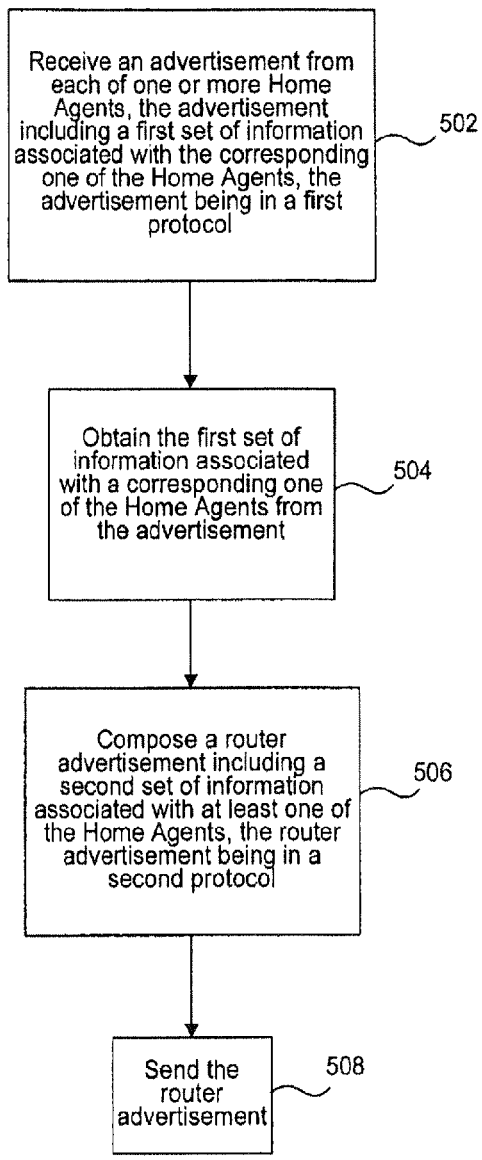
FIG. 5 is a process flow diagram illustrating an example method of processing a router advertisement by an edge router.

FIG. 5 is a process flow diagram illustrating an example method of processing a router advertisement by an edge router. The edge router may receive an advertisement at 502 from each of one or more Home Agents, the advertisement including a first set of information associated with the corresponding one of the Home Agents, each advertisement being in a first protocol. The edge router may then obtain the first set of information associated with a corresponding one of the Home Agents from the advertisement at 504. For example, the first set of information may include a Home Agent IP address, a Home Agent domain name, and/or a load on the Home Agent.

The edge router may compose a router advertisement including a second set of information associated with at least one of the Home Agents, where the router advertisement is in a second protocol at 506. The router advertisement may include one or more extensions, where each of the extensions includes the second set of information associated with at least one of the Home Agents. For example, each extension may be associated with a single Home Agent. In one embodiment, the second protocol is not a routing protocol. For example, the second protocol is ICMP Router Discovery Protocol.

The second set of information associated with a Home Agent may include at least a portion of the first set of information associated with the Home Agent that has been obtained from the advertisement transmitted by or on behalf of the Home Agent. In addition, the second set of information may include additional information that has been generated or obtained by the edge router. For example, the edge router may ascertain a distance to the Home Agent. For instance, the distance may include a hop count. The distance may be determined using a protocol such as Open Shortest Path First (OSPF). Of course, if the load on a particular Home Agent is substantial, the edge router may decide that this is not a desirable Home Agent, and therefore may not ascertain the distance to the Home Agent. Accordingly, a router advertisement may indicate a distance to one or more of the Home Agents from which an advertisement has been received.

It is also important to note that the edge router may choose to provide a second set of information associated with one or more of the Home Agents in the router advertisement. In other words, the edge router may decide to provide the second set of information in the router advertisement only for Home Agents that meet specific criteria. For example, the edge router may select one or more of the Home Agents using the distance to the Home Agent(s) and/or load on the Home Agent(s) as criteria.

Once the edge router has composed a router advertisement, the edge router may transmit the router advertisement at 508. For example, the router advertisement may be broadcast.

Figure 6:
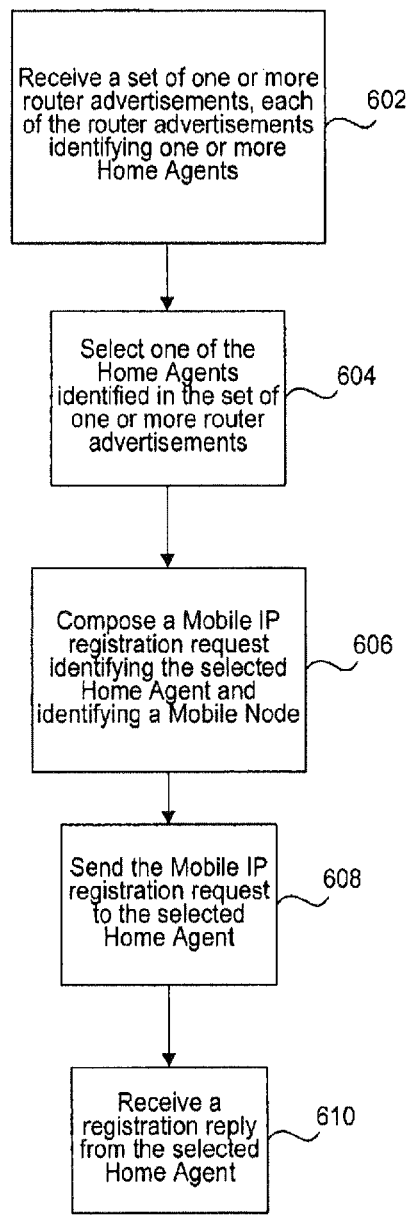
FIG. 6 is a process flow diagram illustrating an example method of registering a Mobile Node with a Home Agent selected using information obtained from a router advertisement.

Upon receiving one or more router advertisements, a Mobile Node may select a Home Agent identified in one of the router advertisements. FIG. 6 is a process flow diagram illustrating a method of registering a Mobile Node with a Home Agent selected using information obtained from a router advertisement. A network device may receive a set of one or more router advertisements at 602, where each of the router advertisements identifies one or more Home Agents. The network device may select one of the Home Agents identified in the set of one or more router advertisements at 604. For example, the network device may select one of the Home Agents using information in the router advertisement(s), such as distance to a particular Home Agent and/or load on the Home Agent. The network device may compose a Mobile IP registration request identifying the selected Home Agent and identifying a Mobile Node at 606. The network device may send the Mobile IP registration request to the selected Home Agent at 608. The network device may then receive a registration reply from the selected Home agent at 610.

Assuming that the node that has roamed is a Mobile Node supporting Mobile IP, the Mobile Node may operate as the network device, as set forth above with reference to FIG. 6. However, although the disclosed embodiments refer to a Mobile Node supporting Mobile IP, it is important to note that the disclosed embodiments may be implemented with a node that does not support Mobile IP. For example, a proxy network device may generate and transmit a registration request on behalf of the node (e.g., upon detecting the presence of the node). For example, such a proxy device may be a Foreign Agent or Access Point. Accordingly, a proxy device may also operate according to FIG. 6 in order to compose a registration request on behalf of a node that does not support Mobile IP.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In accordance with various embodiments, the techniques are implemented in software such as an operating system or in an application running on an operating system.

A software or software/hardware hybrid packet processing system in accordance with the disclosed embodiments may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. Further, various embodiments may be at least partially implemented on a card (e.g., an interface card) for a network device or a general-purpose computing device.

In one embodiment, the network device implementing the disclosed embodiments is a router. The router may include one or more line cards. Referring now to FIG. 7, a router 710 suitable for implementing various embodiments includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 10. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets or data segments over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, LAN interfaces, WAN interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc. Although the system shown in FIG. 7 is one specific router, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The disclosed embodiments may also be embodied in a carrier wave traveling over an appropriate medium such as optical lines, electric lines, etc. Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
   receiving a set of one or more router advertisements, each of the router advertisements identifying one or more Home Agents, wherein at least one of the router advertisements indicates a distance to the corresponding at least one Home Agent, the distance being calculated using the Open Shortest Path First protocol, wherein at least one of the router advertisements indicates a load of the corresponding at least one Home Agent, wherein at least one router advertisement includes an Internet Protocol (IP) address of the corresponding at least one Home Agent;

selecting one of the Home Agents identified in the set of one or more router advertisements based on the distance(s) and the load(s) indicated in the one or more router advertisements;
composing a Mobile IP registration request identifying the selected Home Agent and identifying a Mobile Node;
sending the Mobile IP registration request to the selected Home Agent; and
receiving a registration reply from the selected Home Agent.

2. The method as recited in claim 1, wherein the method is performed by the Mobile Node.

3. The method as recited in claim 1, wherein the method is performed by a Foreign Agent.

4. The method of claim 1, wherein the registration request includes at least one of the Mobile Node's home address or the Mobile Node's care-of address.

5. The method of claim 4, further comprising:
registering the Mobile Node with the selected Home Agent; and
establishing a binding between the Mobile Node and its care-of address.

6. The method of claim 5, further comprising forwarding, by the selected Home Agent, data packets to the Mobile Node at its care-of address.

7. The method of claim 1, wherein at least one router advertisement in the set of one or more router advertisements includes domain name of the selected Home Agent.

8. A system, comprising:
a processor; and
at least one memory device storing instructions that, when executed by the processor, cause the system to:
receive a set of one or more router advertisements, each of the router advertisements identifying one or more Home Agents, wherein at least one of the router advertisements indicates a distance to the corresponding at least one Home Agent, wherein at least one of the router advertisements indicates a load of the corresponding at least one Home Agent, wherein at least one of the router advertisements indicates an Internet Protocol (IP) address of the corresponding at least one Home Agent;
select one of the Home Agents identified in the set of one or more router advertisements based on the distance(s) and the load(s) indicated in the one or more router advertisements;
compose a Mobile IP registration request identifying the selected Home Agent and identifying a Mobile Node;
send the Mobile IP registration request to the selected Home Agent; and
receive a registration reply from the selected Home Agent.

9. The system as recited in claim 8, wherein the processor and the at least one memory device are located in the Mobile Node.

10. The system as recited in claim 8, wherein the processor and the at least one memory device are located in a Foreign Agent.

11. The system as recited in claim 8, wherein the registration request includes at least one of the Mobile Node's home address or the Mobile node's care-of address.

12. The system as recited in claim 11, wherein the instructions when executed further cause the system to:
register the Mobile Node with the selected Home Agent; and
establish a binding between the Mobile Node and its care-of address.

13. The system as recited in claim 12, wherein the instructions when executed further cause the system to forward data packets to the Mobile Node at its care-of address.

14. The system as recited in claim 8, wherein at least one router advertisement in the set of one or more router advertisements includes a domain name of the selected Home Agent.

15. A non-transitory computer-readable storage medium storing one or more sequences of instructions for searching information, the one or more sequences of instructions executed by at least one processor to:
receive a set of one or more router advertisements, each of the router advertisements identifying one or more Home Agents, wherein at least one of the router advertisements indicates a distance to the corresponding at least one Home Agent, the distance being calculated using the Open Shortest Path First protocol, wherein at least one of the router advertisements indicates a load of the corresponding at least one Home Agent;
select one of the Home Agents identified in the set of one or more router advertisements based on the distance indicated in the at least one of the router advertisements;
compose a Mobile IP registration request identifying the selected Home Agent and identifying a Mobile Node;
send the Mobile IP registration request to the selected Home Agent; and
receive a registration reply from the selected Home Agent.

16. The non-transitory computer-readable storage medium as recited in claim 15, wherein the registration request includes at least one of the Mobile Node's home address or the Mobile Node's care-of address.

17. The non-transitory computer-readable storage medium as recited in claim 16, wherein the one or more sequences of instructions further cause the at least one processor to:
register the Mobile Node with the selected Home Agent; and
establish a binding between the Mobile Node and its care-of address.

18. The non-transitory computer-readable storage medium as recited in claim 16, wherein the one or more sequences of instructions further cause the at least one processor to forward data packets to the Mobile Node at its care-of address.

19. The non-transitory computer-readable storage medium as recited in claim 15, wherein at least one router advertisement in the set of one or more router advertisements includes an Internet Protocol (IP) address of the selected Home Agent.

20. The non-transitory computer-readable storage medium as recited in claim 15, wherein the one or more router advertisements are implemented in a routing protocol.

* * * * *